US011943731B2

(12) United States Patent
Nilsson et al.

(10) Patent No.: US 11,943,731 B2
(45) Date of Patent: Mar. 26, 2024

(54) REGISTRATION OF LEGACY FIXED NETWORK RESIDENTIAL GATEWAY (FN-RG) TO A 5G CORE NETWORK

(71) Applicant: Telefonaktiebolaget LM Ericsson (publ), Stockholm (SE)

(72) Inventors: Daniel Nilsson, Älvängen (SE); David Ian Allan, San Jose, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 50 days.

(21) Appl. No.: 17/275,587

(22) PCT Filed: Sep. 9, 2019

(86) PCT No.: PCT/SE2019/050843
§ 371 (c)(1),
(2) Date: Mar. 11, 2021

(87) PCT Pub. No.: WO2020/055309
PCT Pub. Date: Mar. 19, 2020

(65) Prior Publication Data
US 2022/0116901 A1 Apr. 14, 2022

Related U.S. Application Data

(60) Provisional application No. 62/731,124, filed on Sep. 14, 2018.

(51) Int. Cl.
*H04W 60/04* (2009.01)
*H04W 8/18* (2009.01)
(Continued)

(52) U.S. Cl.
CPC ............. *H04W 60/04* (2013.01); *H04W 8/18* (2013.01); *H04W 8/26* (2013.01); *H04W 48/18* (2013.01);
(Continued)

(58) Field of Classification Search
CPC ......... H04W 60/04; H04W 8/18; H04W 8/26; H04W 48/18; H04W 88/16; H04W 92/02; H04W 92/14
See application file for complete search history.

(56) References Cited

U.S. PATENT DOCUMENTS 10,567,962 B1 *  2/2020  Lu ........................ H04W 76/14
2008/0205327 A1 *  8/2008  Tu ...................... H04W 52/0216
370/328

(Continued)

FOREIGN PATENT DOCUMENTS

CN    108738013 A    11/2018
EP    2800417 A1    11/2014
(Continued)

OTHER PUBLICATIONS

Supplemental European Search Report, European Patent Application No. 19859673.6, dated Oct. 20, 2021, 15 pages.
(Continued)

*Primary Examiner* — Steven S Kelley
(74) *Attorney, Agent, or Firm* — Sage Patent Group

(57) ABSTRACT

A 5G Fixed Mobile Interworking Function Database entity, FMIF-DB, in a system including a Wireline 5G Access Network, W-5GAN, connects to a Fixed Network Residential Gateway, FN-RG, the W-5GAN including a Wireline Access Node, AN, and a 5G Fixed Mobile Interworking Function, FMIF. The FMIF connects to Access and Mobility Management Function, AMF, and to an User Plane Function, UPF, and the FMIF DN. The wireline Access Node, couples to a Fixed Network Residential Gateway, FN-RG providing services such as TV, Internet and voice, the database apparatus being adapted for holding—User entity, UE, credentials for providing an identity of an FN-RG as a User Entity, UE, and—UE configuration data for the FN-RG.

7 Claims, 8 Drawing Sheets

(51) Int. Cl.
*H04W 8/26* (2009.01)
*H04W 48/18* (2009.01)
*H04W 88/16* (2009.01)
*H04W 92/02* (2009.01)
*H04W 92/14* (2009.01)

(52) U.S. Cl.
CPC ............ *H04W 88/16* (2013.01); *H04W 92/02* (2013.01); *H04W 92/14* (2013.01)

(56) References Cited

U.S. PATENT DOCUMENTS

| | | | |
|---|---|---|---|
| 2010/0122338 A1* | 5/2010 | Kataoka | H04W 12/041 380/278 |
| 2011/0319054 A1* | 12/2011 | Cutler | H04M 15/66 455/406 |
| 2011/0320323 A1* | 12/2011 | Cuervo | H04M 15/55 705/30 |
| 2012/0052857 A1* | 3/2012 | Kumar | H04W 24/08 455/466 |
| 2012/0322406 A1* | 12/2012 | Cuervo | H04L 61/4557 455/408 |
| 2014/0351591 A1* | 11/2014 | Kodama | H04W 12/08 713/168 |
| 2015/0237594 A1* | 8/2015 | Zhou | H04W 8/08 370/338 |
| 2017/0013441 A1 | 1/2017 | Manik et al. | |
| 2017/0195174 A1* | 7/2017 | Bhaskara | H04L 41/0806 |
| 2021/0076301 A1* | 3/2021 | Yu | H04W 12/06 |
| 2021/0099351 A1* | 4/2021 | Li | H04L 12/66 |
| 2021/0195689 A1* | 6/2021 | Pocha | H04W 28/24 |

FOREIGN PATENT DOCUMENTS

| | | |
|---|---|---|
| WO | WO 2016/170006 A1 | 10/2016 |
| WO | WO 2018/233485 A1 | 12/2018 |
| WO | WO 2019/196860 A1 | 10/2019 |

OTHER PUBLICATIONS

Broadband Forum: "SD-420 R2 5G Fixed Mobile Convergence Study," 3GPP Draft; SD-420R2, $3^{rd}$ Generation Partnership Project (3GPP), Mobile Competence Centre; Sep. 9, 2018 (XP051561326) 107 pages.

"BBF Recommendations and Requests for Feedback from 3GPP SA2—Accompanying Document to SD-420 Revision 2," 3rd Generation Partnership Project (3GPP), Mobile Competence Centre; Sep. 9, 2018 (XP051561325) 20 pages.

3rd Generation Partnership Project; Technical Specification Group Services and System Aspects; Study on the Wireless and Wireline Convergence for the 5G system architecture (Release 16) 3GPP TR 23.716 V16.0.0 (Dec. 2018) (XP051546260) 184 pages.

International Search Report and Written Opinion of the International Searching Authority, PCT/SE2019/050843, dated Dec. 18, 2019, 13 pages.

* cited by examiner

REGISTRATION OF LEGACY FIXED NETWORK RESIDENTIAL GATEWAY (FN-RG) TO A 5G CORE NETWORK

CROSS REFERENCE TO RELATED APPLICATIONS

This application is a 35 U.S.C. § 371 national stage application of PCT International Application No. PCT/SE2019/050843 filed on Sep. 9, 2019, which in turns claims domestic priority to U.S. Provisional Patent Application No. 62/731,124, filed on Sep. 14, 2018, the disclosures and content of which are incorporated by reference herein in their entirety.

TECHNICAL FIELD

The present invention is directed to methods and apparatuses involving 5G system technologies. More particularly, the invention is directed to the registration of legacy residential gateways to a 5G Core Network.

BACKGROUND

The so-called 5G system (5GS) according to the 3GPP specifications consists of a 5G Access Network (5G-AN), 5G Core Network (5G-CN) and UE (User Entity). The 5G System architecture is defined to support data connectivity and services enabling deployments to use techniques such as e.g. Network Function Virtualization and Software Defined Networking. Among others the architecture supports a separation of User Plane (UP) functions from Control Plane (CP) functions, allowing independent scalability, evolution and flexible deployments e.g. centralized location or distributed, remote, location. Another object is to minimize dependencies between the Access Network (AN) and the Core Network (CN). The architecture is defined with a converged core network with a common AN-CN interface which integrates different Access Types e.g. 3GPP access and non-3GPP access.

In the 5G work in 3GPP a split between Mobility Management (MM) and Session Management (SM) has been defined. An Access and Mobility Function (AMF) supports MM functionality and the Session Management Function (SMF) supports SM functionality. The AMF (Access and Mobility Management Function) selects the SMF. Different SMFs may be selected for different PDU (Packet Data Unit) Sessions of a UE (User Entity), e.g. PDU Sessions to different Data Network Names (DNNs)/Access Point Name, APNs, or the same SMF may be used. FIG. 1 (corresponding to FIG. 4.2.3-1 of 3GPP TS 23.501 V15.2.0 (2018-06)) depicts the non-roaming reference architecture. Service-based interfaces are used within the Control Plane. FIG. 2 (corresponding to FIG. 4.2.3-2, 3GPP TS 23.501 V15.2.0 (2018-06)) depicts the 5G System architecture in the non-roaming case, using the reference point representation showing how various network functions interact with each other.

In 5GS the reference points between UE and AMF and between R(AN) (Radio Access Node) should be access agnostic so that adding support for new accesses should not impact these interfaces. Some variances are allowed but that is typically limited to that some procedures are only applicable for certain accesses and that information elements might differ to some extent.

3GPP and BroadBand Forum (BBF) has been performing studies to add support for fixed access in 5GC. FIG. 3 shows a system architecture for fixed access in 5G-RG (Residential Gateway) case. The residential gateway offers PC, Voice (e.g. IP telephony), TV and other services to a home user, for instance over an Ethernet Interface. The 5G-RG connects over an N1 interface to a W-5GAN, Wireline 5G Access Network, comprising a Wireline Access Node, AN, and a Fixed Access Gateway Function, FAGF. The FAGF connects to AMF via N2 and to UPF via N3. FIG. 3 is described in 3GPP TR 23.716 v1.0.0, 2018-09, FIG. 6.1-1.

Comparing FIG. 1 and FIGS. 2/3, it is seen that the UE corresponds to the 5G-RG and that the R(AN) (Radio Access Node) corresponds to the Fixed Access Gateway Function, FAGF. The 5G-RG is using a wireline access network (cable, fiber, xDSL (Digital Subscriber Line)) to connect to the FAGF. The 5G-RG is an adapted residential gateway that has support for N1 (NAS—Non-Access Stratum) signalling with the 5GC so in this case there is a direct N1 interface between 5G-RG and AMF. These messages will be carried first between 5G-RG and FAGF (Fixed Access Gateway Function) and then relayed over N2.

For a 5G-RG to start using the services of 5GC, it is required that the 5G-RG registers to the network. This procedure is described in 23.502 for 3GPP access and untrusted non-3GPP access. The registration procedure will be similar for fixed access and 5G-RG will need to authenticate itself to the 5GC network using SIM (or other e.g., PKI (Public Key Infrastructure) certificate) credentials. To be able to do the registration procedure there must be a transport protocol between 5G-RG and AGF (Access Gateway Function).

FIG. 4, shows a Fixed Network Residential Gateway, FN-RG, that implements the functionality of a 3GPP UE augmented with additional capabilities to support non-3GPP devices in the home. An FN-RG is not supporting direct connection with 5GC Network Function e.g. it does not support 5G NAS. A non-exhaustive list would include strong credentials, a NAS stack, and the ability to support subtending UEs in the home in addition to non-3GPP devices. Existing Fixed Network RGs (FN-RGs) do not have 3GPP credentials, no NAS stack, and have no awareness of 3GPP specified devices. An FN-RG uses either IPoE (Internet Protocol over Ethernet) or PPPoE (Point-to-Point Protocol over Ethernet) as an access protocol and has functionalities to support devices connected to both 802.11 WiFi and 802.1D Local Area Networks, LANs. Point-to-Point Protocol (PPP) has been a dominant session control protocol in wireline broadband networks. IPoE relies on Dynamic Host Configuration Protocol (DHCP) to provide many of the capabilities provided by Point-to-Point Protocol over Ethernet (PPPoE). In the case of both the PPPoE and IPoE protocol suites redundancy is achieved by having multiple IP edges in the network offer service to an FN-RG and it selects an IP edge. Many operators have expressed interest in supporting FN-RGs using the 5GC. Elements, among others showing a BBF core, of FIG. 4 are described in 3GPP TR 23.716 v1.0.0, 2018-09, FIG. 6.23.1-1.

Prior art document SD-420 R2 5G Fixed Mobile Convergence Study, BroadBandForum, BBF, Vers. 04, August 2018 discloses a study to find common interfaces for the Access Network and Core Network, to support converged wireline-wireless networks that use the 5G core network. This project will specify of a 5G Access Gateway Function (FAGF) that adapts fixed access onto the 5G core, and then consider and specify several architectural deployment options as well as the underlying infrastructure sharing aspects.

SUMMARY

In a fixed access line network, a line or circuit identifier is used as the identity for the circuit between fixed access network and the home/FN-RG. The FN-RG is not aware of this identity. A key difference between fixed and mobile authentication is that a fixed subscription can have a trust relationship bound to a physical facility, therefore authentication procedures are relatively trivial with frequently just the line/circuit identifier being provided by a trusted entity in a connection-oriented data path between the FN-RG and the service edge being sufficient to identify a subscriber.

In a mobile network, strong credentials are employed leading to the exchange of temporary identifiers. Since these transactions are computational intensive, signalling procedures and temporary identifiers have been designed to minimize the overhead of a UE repeatedly connecting and disconnecting from the network. Since FN-RG is not a 3GPP UE it will not be able to interact with the 5GC control plane and authentication systems, nor will it store/use 3GPP related static and dynamic information that is normally required by a 3GPP UE.

One solution would be to modify the 5GC interfaces from the 5G Fixed Mobile Interworking Function, FMIF, to address this. As a further alternative solution an FMIF could also be made very stateful in the role as a proxy UE.

It is a first object to set forth a methods and apparatuses for providing improved and more reliable services for residential gateways.

The object mentioned above has been solved by at least one of:

A 5G Fixed Mobile Interworking Function Database entity, FMIF-DB, in a system comprising a Wireline 5G Access Network, W-5GAN, connecting to a Fixed Network Residential Gateway, FN-RG, the W-5GAN comprising a Wireline Access Node, AN, and a 5G Fixed Mobile Interworking Function, FMIF, the FMIF connecting to Access and Mobility Management Function, AMF, and to an User Plane Function, UPF, and the FMIF DN, the wireline Access Node, coupling to a Fixed Network Residential Gateway, FN-RG providing services such as TV, Internet and voice,
  the database apparatus being adapted for holding
    User entity, UE, credentials for providing an identity of an FN-RG as a User Entity, UE, and
    UE configuration data for the FN-RG.

Provisioning service entity in a system comprising a data base entity, a UDM and a Certificate Authority, CA, the provisioning service entity being adapted for
  receiving a create user message from an actor such as an operator,
  creating a subscription for a Fixed Network Residential Gateway, FN-RG, identity in the provisioning service entity,
  issuing a request to UDM, Unified Data Management/UDR, Unified Data Repository, to setup UE credential and configuration,
  issuing request to 5G Fixed Mobile Interworking Function Database, FMIF-DB to setup UE credential and configuration data for FN-RG.

A 5G Fixed Mobile Interworking Function Database entity, FMIF, adapted for communicating with a 5G Fixed Mobile Interworking Function Database entity database, FMIF-DB, the FMIF moreover being adapted for communicating with a Wireline Access Node, AN, and an Access and Mobility Management Function, AMF, the FMIF being further adapted for upon
  receiving a Dynamic Host Configuration Protocol, DHCP, discover message from the AN comprising a circuit ID,
  issuing a request for a circuit identity, ID,
  performing NAS procedures with the AMF,
  issuing a store request message to the FMIF-DB
  receiving a response from the FMIF-DB., This object has been solved by at least one of the methods explained more closely in the following detailed description.

Among the advantages of at least some embodiments of the invention, are that they are associated with no or little standardization impact. This is desirable for a deployment scenario where 5G-RGs replace FN-RGs.

DETAILED DESCRIPTION

Figure 5:
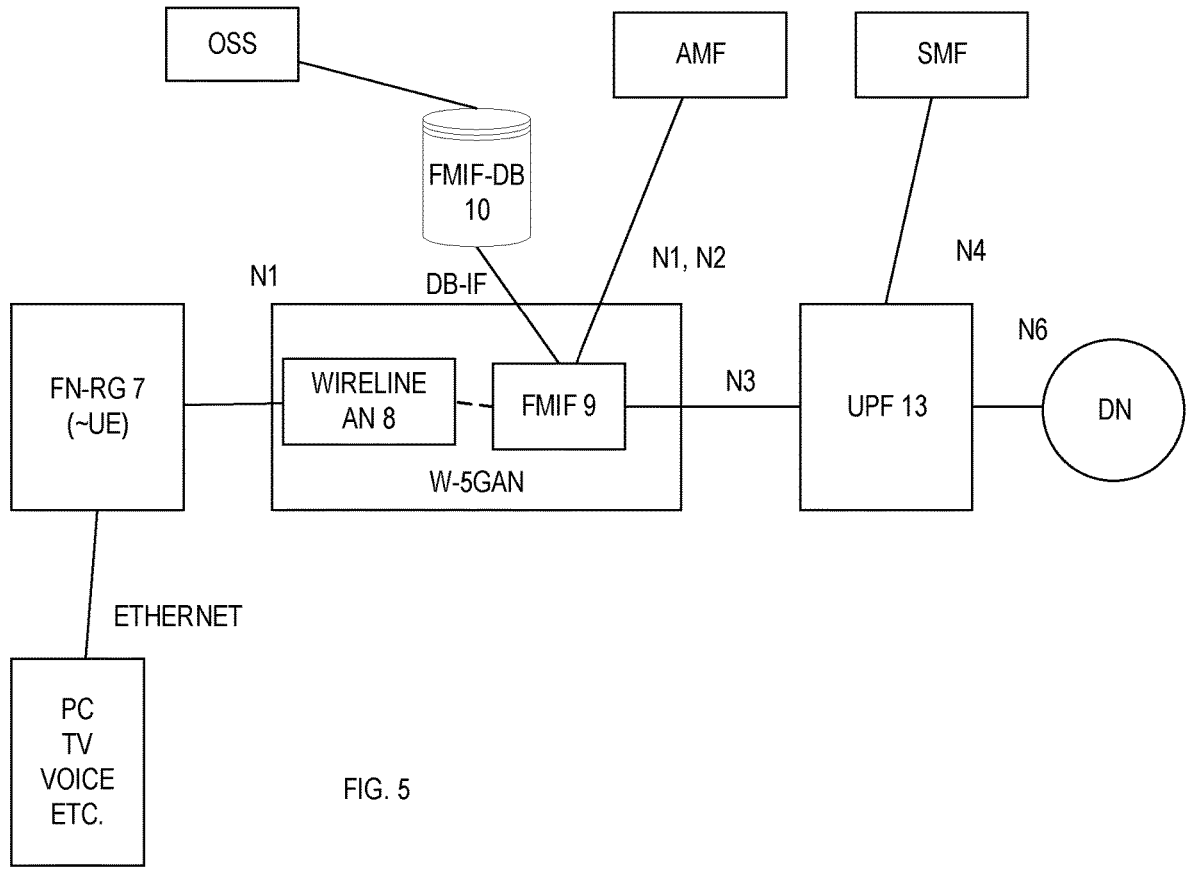
FIG. 5 shows a system according to an embodiment of the invention.

According to one aspect of the invention an architecture is provided as depicted in FIG. 5.

The 5G Fixed Mobile Interworking Function, FMIF, is connected with a database, FMIF-DB.

The FMIF may also be referred to as a 5G Access Gateway Function (FAGF).

The FMIF-DB stores in some embodiments of the invention:

1. UE credentials. Identity of the UE and credentials for proving the identity (e.g., a pre-shared key or certificate), typically indexed by existing practice such as circuit ID.

2. UE configuration data. Normally stored in USIM/UE but since this is a legacy FN-RG, there is no support to store this data in the UE.

3. UE dynamic data. All data normally received by a UE from the network, which it stores for future use. Examples could be 5G-GUTI, forbidden tracking areas, back off time etc.

An Operations support system, OSS, can also be integrated with the FMIF-DB so that when an operator configures a new subscription, the UE UICC data can be stored in the FMIF-DB.

Figure 6:
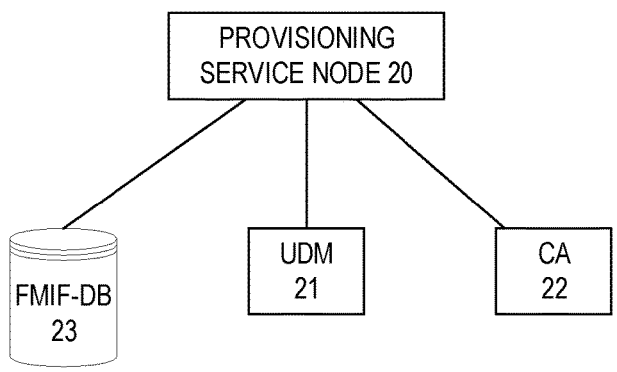
FIG. 6 shows further system nodes according to a still further embodiment.

According to still further embodiments of the invention there is provided a system as shown on FIG. 6 comprising a Provisioning Service Node 20, coupled to a FMIF-DB 10, a Unified Data Management, UDM, 21 and a Certificate Authority, CA, 22, respectively.

The provisioning service is a logical node that can carry out the task to setup a new subscription for a FN-RG.

FMIF-DB is explained earlier.

UDM is the Unified Data Management node as defined in 23.501 (this could also be a UDR as defined in same document).

CA is a Certificate Authority node that can sign new certificates that are trusted by the network. Client certificates will be used if using EAP-TLS (Extensible Authentication Protocol-Transport Layer Security) to authenticate the UE (FN-RG) identity and is an example for credentials that can be used. Another possible credential could be to use username/password.

Figure 7:
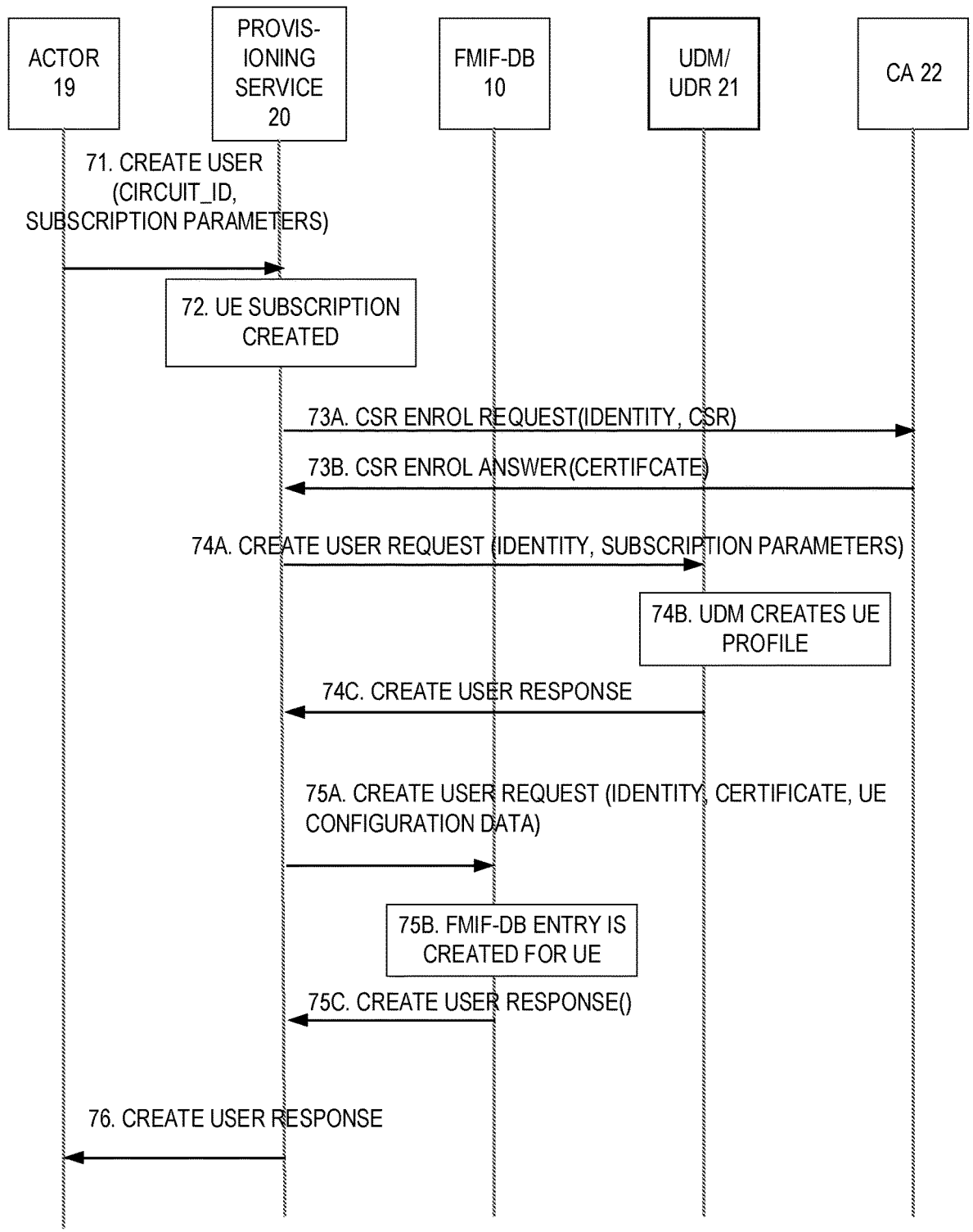
FIG. 7 shows a sequence diagram for an embodiment of a method of the invention.

In FIG. 7, a procedure for the FIG. 6 system is shown. The FIG. 7 procedure may be carried out initially and only once for a given 5G-RG.

71. An actor 19 (e.g. an operator) decides to create a new subscription for a certain circuit identity and the applicable subscription parameters are passed to the provisioning service node. Create user (circuit_id, subscription parameters) is transmitted to the provisioning service node 20.

72. The provisioning service node 20 creates the UE subscription, which primarily is a set of subscription data for the FN-RG/circuit identity.

73. Optional steps: requesting and receiving a FN-RG certificate from a CA. 73a. CSR enrol request (identity, CSR) is issued to CA. 73b. CSR enrol answer (certificate) is responded with.

74. The provisioning service node sends request to UDM (Unified Data Management)/UDR (Unified Data Repository) to create subscription data/policy data for the FN-RG 7. 74a. Provisioning service node 20 sends a Create user request (identity, subscription parameters) to UDM/UDR. 74b. UDM/UDR creates UE profile.

75. The provisioning service node 20 sends a request to FMIF-DB 10 to setup UE credential and configuration data for FN-RG 7. Message 75a. may take the form Create user request (identity, certificate, UE configuration data). 75b. FMIF-DB entry is created for UE. 75c. A Create user response is transmitted back to the provisioning service node 20.

76. A response—Create user response—is transmitted back to actor 19.

Figure 8:
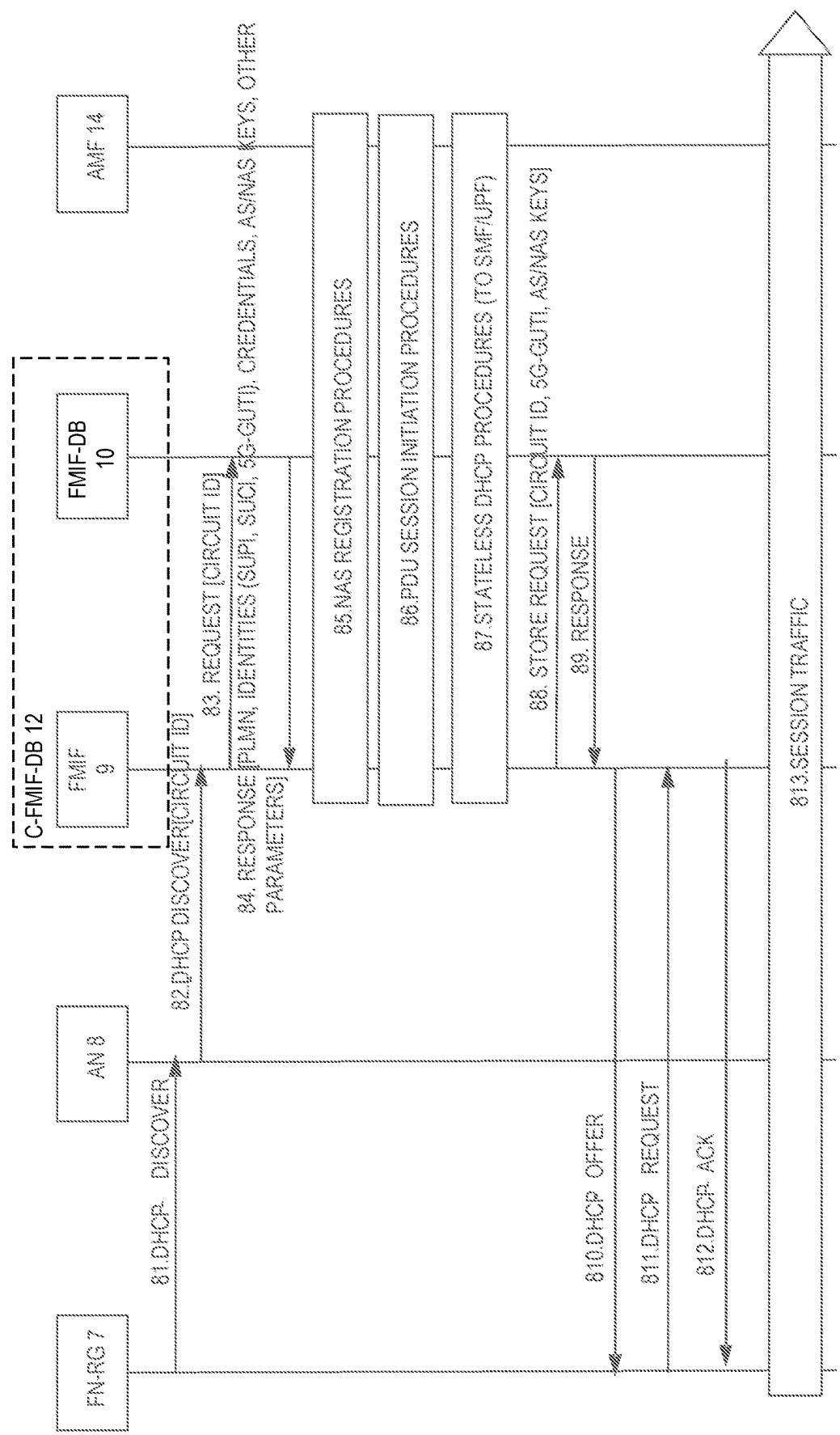
FIG. 8 shows a sequence diagram for a still further embodiment of the invention.

In FIG. 8, a call-flow is shown for an IPoE embodiment of the invention making use of the FIG. 5 architecture. IPoE relies on Dynamic Host Configuration Protocol (DHCP) to provide many of the capabilities provided by Point-to-Point Protocol over Ethernet (PPPoE).

Steps 83, 84, 88 and 89 are novel steps.

When FN-RG, 7, attach to FMIF/5GC, 9, the request/response map a circuit id with a set of UE parameters:

- PLMN identity to be preferred as serving PLMN identity
- identity which could be a SUPI (SUbscription Permanent Identifier), SUCI (SUbscription Concealed Identifier) or 5G-GUTI (Globally Unique Temporary Identity) if the FN-RG has been registered to 5GC.
- Credentials which could be a pre-shared key and/or a certificate to be used for EAP-TLS to prove the FN-RG identity (e.g., SUPI).
- AS/NAS keys if there is already AS/NAS security contexts for the FN-RG
- Other parameters applicable for the FN-RG to be able to register to 5GC like UE 5G capabilities, requested NSSAI (Network Slice Selection Assistance Information), list of PDU sessions to be activated, MICO (Mobile Initiated Connection Only) mode preferences, requested DRX (Discontinuous Reception), parameters. All these parameters are described in 23.501 and 23.502.

Step 85 and 86 will use the parameters received by FMIF in step 83.

At step 88, FMIF update the FMIF-DB with the dynamic data received during step 85 and 86.

This could include:

- 5G-GUTI i.e., a temporary identity for the UE which could be used for quicker re-registration and to come back to CM_CONNECTED mode if the FN-RG has been for some reason put to CM_IDLE mode.
- AS/NAS keys for the security contexts
- Registration area
- Mobility restrictions
- PDU session status
- NSSAI value (allowed, mapping of allowed NSSAI, configured NSSAI for the serving PLMN)
- LADN information
- Accepted MICO mode
- IMS voice over PS session supported indicator
- Accepted DRX parameters Parameters are described in 23.501 and 23.502.

The following signalling is provided over the nodes shown designated by their reference signs:

81. DHCP DISCOVER—FN-RG 7 to AN 8
82. DHCP DISCOVER [CIRCUIT ID]—AN 8-FMIF 9
83. REQUEST [CIRCUIT ID]—FMIF 9-FMIF DB 10
84. RESPONSE [PLMN, IDENTITIES (SUPI, SUCI, 5G-GUTI), CREDENTIALS, AS/NAS KEYS, OTHER PARAMETERS]—FMIF DB 10-FMIF 9
85. NAS REGISTRATION PROCEDURES, between FMIF 9, FMIF DB 10, 11
86. PDU SESSION INITIATION PROCEDURES between FMIF 9, FMIF DB 10, 11
87. STATELESS DHCP PROCEDURES (TO SMF/UPF) between FMIF 9, FMIF DB 10, 11
88. STORE REQUEST [CIRCUIT ID, 5G-GUTI, AS/NAS KEYS], FMIF 9-FMIF DB 10
810. DHCP OFFER, FMIF 9-FN-RG 7
811. DHCP REQUEST, FN-RG 7-FMIF 9
812. DHCP ACK, FMIF 9-FN-RG 7
813. SESSION TRAFFIC FN-RG 7-AN 8-FMIF 9-FMIF DB 10-AMF 14

Nodes 9 FMIF and 10 FMIF-DB may in still other embodiments be combined in a combined node C-FMIF-DB 12.

Figure 9:
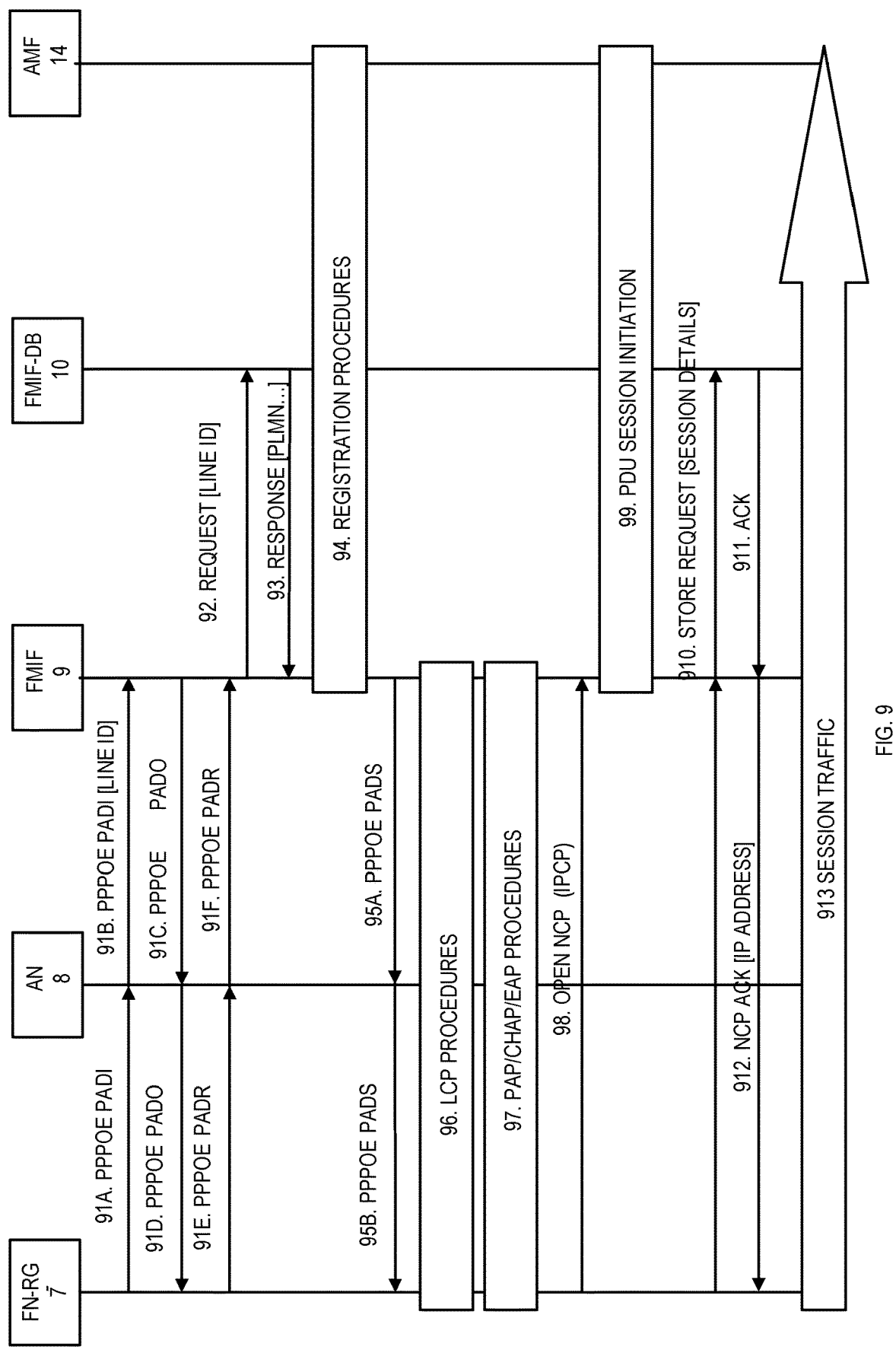
FIG. 9 shows a variant of the FIG. 8 embodiment, FIG. 10 show various nodes for implementing aspects of the invention.

In FIG. 9 an embodiment for a call-flow for a PPPoE solution is shown.

Step 92, 93, 910 and 911 are novel steps and are identical to steps 83, 84, 88 and 89 in FIG. 8.

The only difference in this figure is that PPPoE is used between FN-RG and FMIF.

PPPoE procedures do not offer an IP address as part of the initial solicitation, so the PPPoE PADR is obtained without needing to engage the 5GC (AMF) system (this would correspond to FMIF selection if there was more than 1).

There is no need to perform session initiation until the FN-RG attempts to get an IPv4 or IPv6 address (open an NCP in step 8). The FIG. 8 embodiment is work conserving in relation to DHCP where there is a need to offer an address before the client picks the offer the client will accept.

The following signalling is provided over the shown nodes designated by their reference signs:

91A. PPPOE PADI, FN-RG 7-FMIF 9
91B. PPPOE PADI [LINE ID], AN 8-FMIF 9
91C. PPPOE PADO, FMIF 9-AN 8
91D. PPPOE PADO, AN 8-FN-RG 7
91E. PPPOE PADR, FN-RG 7-AN 8
91F. PPPOE PADR, AN 8-FMIF 9
92. REQUEST [LINE ID], FMIF 9-FMIF DB 10
93. RESPONSE [PLMN . . . ], FMIF DB 10-FMIF 9
94. REGISTRATION PROCEDURES
95A. PPPOE PADS, FMIF 9-AN 8

95B. PPPOE PADS, AN 8-FN-RG 7
96. LCP PROCEDURES
97. PAP/CHAP/EAP PROCEDURES
98. OPEN NCP (IPCP), FN-RG 7-FMIF 9
99. PDU SESSION INITIATION
910. STORE REQUEST [SESSION DETAILS], FN-RG 7-FMIF 9-FMIF DB 10
911. ACK, FMIF DB 10-FMIF 9
912. NCP ACK [IP ADDRESS], FMIF 9-FN-RG 7
913 SESSION TRAFFIC, FN-RG 7-AN 8-FMIF 9-FMIF DB 10-AMF 14.

Nodes 9 FMIF and 10 FMIF-DB may in still other embodiments be combined in a combined node C-FMIF-DB 12.

Figure 10:
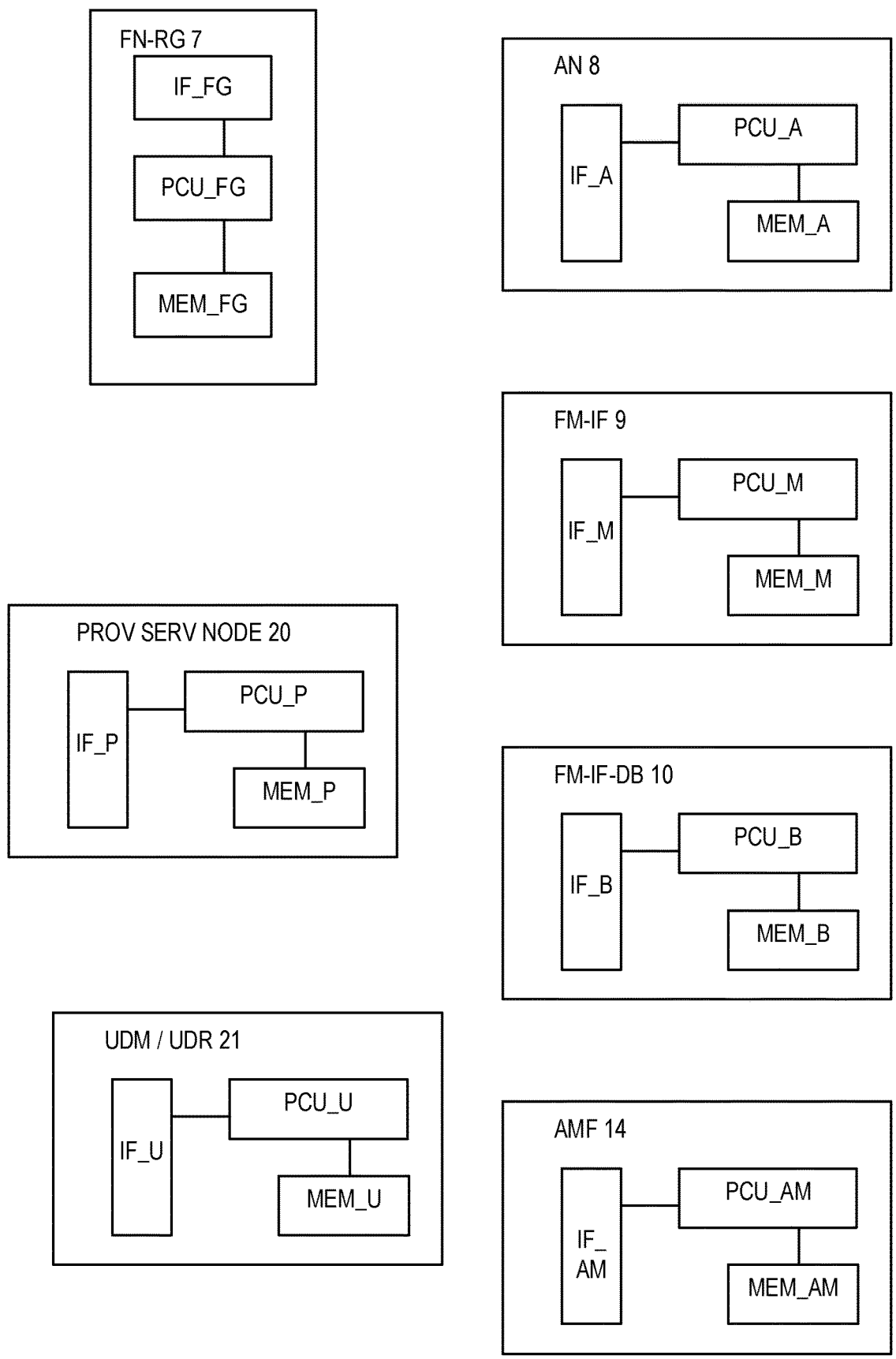
Figure 11:
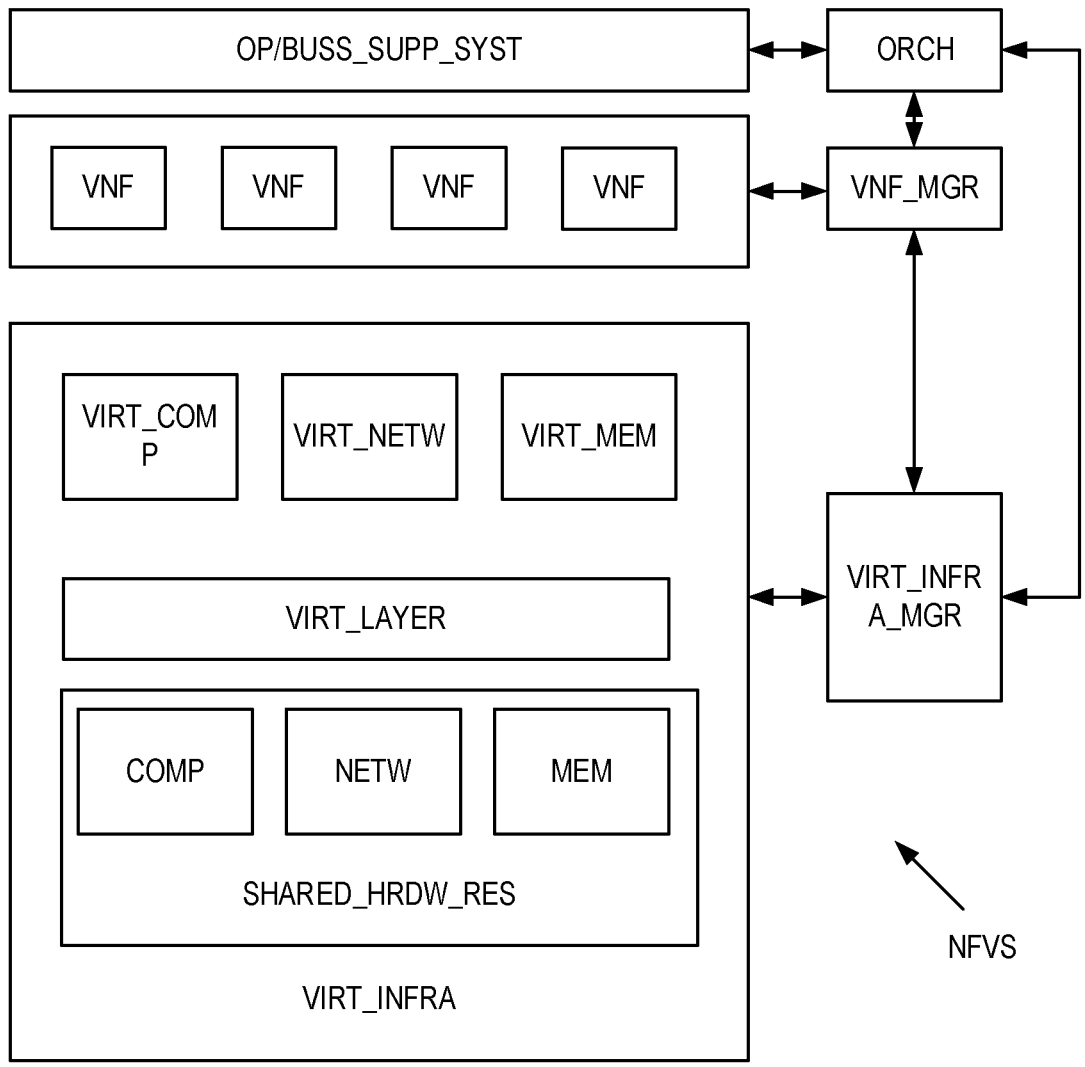
FIG. 11 shows an implementation of aspects of the invention in a virtualized environment.

In FIG. 10, there is shown a user equipment, FN-RG 7, apparatus according to an embodiment of the invention.

The UE comprises a processor PCU_FG an interface IF_UE and a memory, MEM_FG, in which memory instructions are stored for carrying out the method steps explained above. The FN-RG 7 communicates via the interface IF_FG. The IF_FG comprises both an external interface, communicating with a transmitter and receiver, and internal interfaces (not shown).

There is also shown an AN 8 comprising a processor PCU_A, an interface IF_A; and a memory, MEM_A. Instructions are stored in the memory for being performed by the processor such that the method steps explained above are carried out and signalling is communicated on the interface.

Further, a FMIF 9 is provided comprising a processor PCU_M, an interface IF_M; and a memory, MEM_M. Instructions are stored in the memory for being performed by the processor such that the method steps explained above are carried out and signalling is communicated on the interface.

Moreover, a FMIF-DB 10 is provided comprising a processor PCU_B, an interface IF_B; and a memory, MEM_B. Instructions are stored in the memory for being performed by the processor such that the method steps explained above are carried out and signalling is communicated on the interface.

In FIG. 10, there is moreover shown an Access and Mobility Management Function, AMF, 14 comprising a processor PCU_AM, an interface IF_AM; and a memory, MEM_AM. Instructions are stored in the memory for being performed by the processor such that the method steps explained above are carried out and signalling is communicated on the interface.

Also, a Provisioning Service Node 20 is shown comprising a processor PCU_P, an interface IF_P; and a memory, MEM_P. Instructions are stored in the memory for being performed by the processor such that the method steps explained above are carried out and signalling is communicated on the interface.

Finally, a UDM/UDR 21 is provided comprising a processor PCU_U an interface IF_U; and a memory, MEM_U. Instructions are stored in the memory for being performed by the processor such that the method steps explained above are carried out and such that corresponding signalling is effectuated on the interface.

According to embodiments of the invention systems and apparatuses are disclosed:

A 5G Fixed Mobile Interworking Function Database entity, FMIF-DB, 10 in a system comprising a Wireline 5G Access Network, W-5GAN, connecting to a Fixed Network Residential Gateway, FN-RG, 7, the W-5GAN comprising a Wireline Access Node, AN, 8 and a 5G Fixed Mobile Interworking Function, FMIF, 9, the FMIF 9 connecting to Ac-cess and Mobility Management Function, AMF, 14 and to an User Plane Function, UPF, 13 and the FMIF DN 10, the wireline Access Node 8, coupling to a Fixed Network Residential Gateway, FN-RG 7 providing services such as TV, Internet and voice,
   the database apparatus 10 being adapted for holding
   User entity, UE, credentials for providing an identity of an FN-RG 7 as a User Entity, UE, and
   UE configuration data for the FN-RG 7.
A Database is further provided moreover adapted for holding
   UE dynamic data, such as 5G GUTI.

A Provisioning service entity 20 is a provided in a system comprising a data base entity 10, a UDM 21 and a Certificate Authority, CA 22, the provisioning service entity 20 being adapted for
   receiving a create user message 71 from an actor 19 such as an operator,
   creating 72 a subscription for a Fixed Network Residential Gateway, FN-RG, 7, identity in the provisioning service entity 20,
   issuing 74A a request to UDM, Unified Data Management/UDR, Unified Data Repository, 21 to setup UE credential and configuration,
   issuing 75A request to 5G Fixed Mobile Interworking Function Database, FMIF-DB 10 to setup UE credential and configuration data for FN-RG 7.

The provisioning service entity 20 may be configured such that, upon an FMIF-DB 10 entry is created for the UE, and
   receiving 75C a create user response message from the FMIF DB 10,
   transmitting a Create User Response to the actor 19.

The provisioning service entity 20 may moreover being adapted for connecting to a Certificate Authority, CA, wherein the provisioning service entity may
   request 73A a FN-RG certificate from a CA,
   receive 73B a FN-RG certificate from a CA.

A 5G Fixed Mobile Interworking Function Database entity, FMIF, 9 adapted for communicating with a 5G Fixed Mobile Interworking Function Database entity database, FMIF-DB 10, the FMIF moreover being adapted for communicating with a Wireline Access Node, AN, 8 and an Access and Mobility Management Function, AMF 14, the FMIF being further adapted for upon
   receiving 82 a Dynamic Host Configuration Protocol, DHCP, discover message from the AN comprising a circuit ID,
   issuing 83 a request for a circuit identity, ID,
   performing 85, 86, 87 NAS procedures with the AMF,
   issuing 88 a store request message to the FMIF-DB,
   receiving 89 a response from the FMIF-DB.

FMIF according to claim 7 wherein, a DHCP offer is issued to a Fixed Network Residential Gateway, FN-RG, 7.

The above apparatuses/entities are adapted to communicate over known external telecom interfaces or via application programming interfaces, API, as appropriate.

According to embodiments of the invention the following methods are disclosed.

Method for a 5G Fixed Mobile Interworking Function Database entity, FMIF-DB, 10 in a system comprising a Wireline 5G Access Network, W-5GAN, connecting to a Fixed Net-work Residential Gateway, FN-RG, 7, the W-5GAN comprising a Wireline Access Node, AN, 8 and a 5G Fixed Mobile Interworking Function, FMIF, 9, the FMIF 9 connecting to Ac-cess and Mobility Management Function, AMF, 14 and to an User Plane Function, UPF, 13 and the FMIF DN 10, the wireline Access Node 8, coupling to a Fixed Net-work Residential Gateway, FN-RG 7 providing services such as TV, Internet and voice, the database apparatus 10 being adapted for holding User entity, UE, credentials for providing an identity of an FN-RG 7 as a User Entity, UE, and
UE configuration data for the FN-RG 7.

A Method for a Database may moreover be adapted for holding
UE dynamic data, such as 5G GUTI.

A Method for a provisioning service entity 20 in a system may comprise a data base entity 10, a Unified Data Management/Unified Data Repository, UDM/UDR 21 and a Certificate Authority, CA 22. The method may comprise the steps of receiving a create user message 71 from an actor 19 such as an operator,
creating 72 a subscription for a Fixed Network Residential Gateway, FN-RG, 7, identity in the provisioning service entity 20,
issuing 74A a request to UDM, Unified Data Management/UDR, Unified Data Repository, 21 to setup UE credential and configuration,
issuing 75A request to 5G Fixed Mobile Interworking Function Database, FMIF-DB 10 to setup UE credential and configuration data for FN-RG 7.

A method for a provisioning service entity 20 is further provided, wherein upon an FMIF-DB 10 entry is created for the UE, the provisioning service entity 20 receiving 75C a create user response message from the FMIF DB 10,
transmitting a Create User Response to the actor 19.

A method for a provisioning service entity 20 that is provided may moreover be adapted for connecting to a Certificate Authority, CA, the method comprising issuing a request 73A a FN-RG certificate from a CA,
receive 73B a FN-RG certificate from the CA.

A method for a 5G Fixed Mobile Interworking Function Database entity, FMIF, 9 adapted for communicating with a 5G Fixed Mobile Interworking Function Database entity data-base, FMIF-DB 10, the FMIF moreover being adapted for communicating with a Wireline Access Node, AN, 8 and an Access and Mobility Management Function, AMF 14, the FMIF being further adapted for upon
receiving 82 a Dynamic Host Configuration Protocol, DHCP, discover message from the AN comprising a circuit ID,
issuing 83 a request for a circuit identity, ID,
performing 85, 86, 87 NAS procedures with the AMF,
issuing 88 a store request message to the FMIF-DB,
receiving 89 a response from the FMIF-DB.

A method for a FMIF is provided wherein, a DHCP offer is issued to a Fixed Net-work Residential Gateway, FN-RG, 7.

It is noted that the features of the methods described above and, in the following, may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. For example, the program code means may be loaded in a memory, such as a RAM (Random Access Memory), from a storage medium, such as a read-only memory (ROM) or other non-volatile memory, such as flash memory, or from another device via a suitable data interface, the described features may be implemented by hardwired circuitry instead of software or in combination with software.

Figure 1:
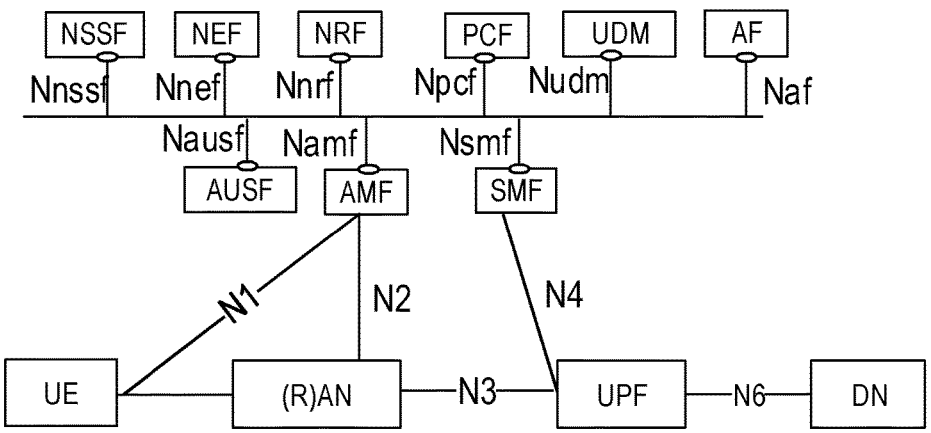
FIGS. 1 and 2 show a known reference architecture for a 5G access and core network system for a non-roaming scenario.
Figure 2:
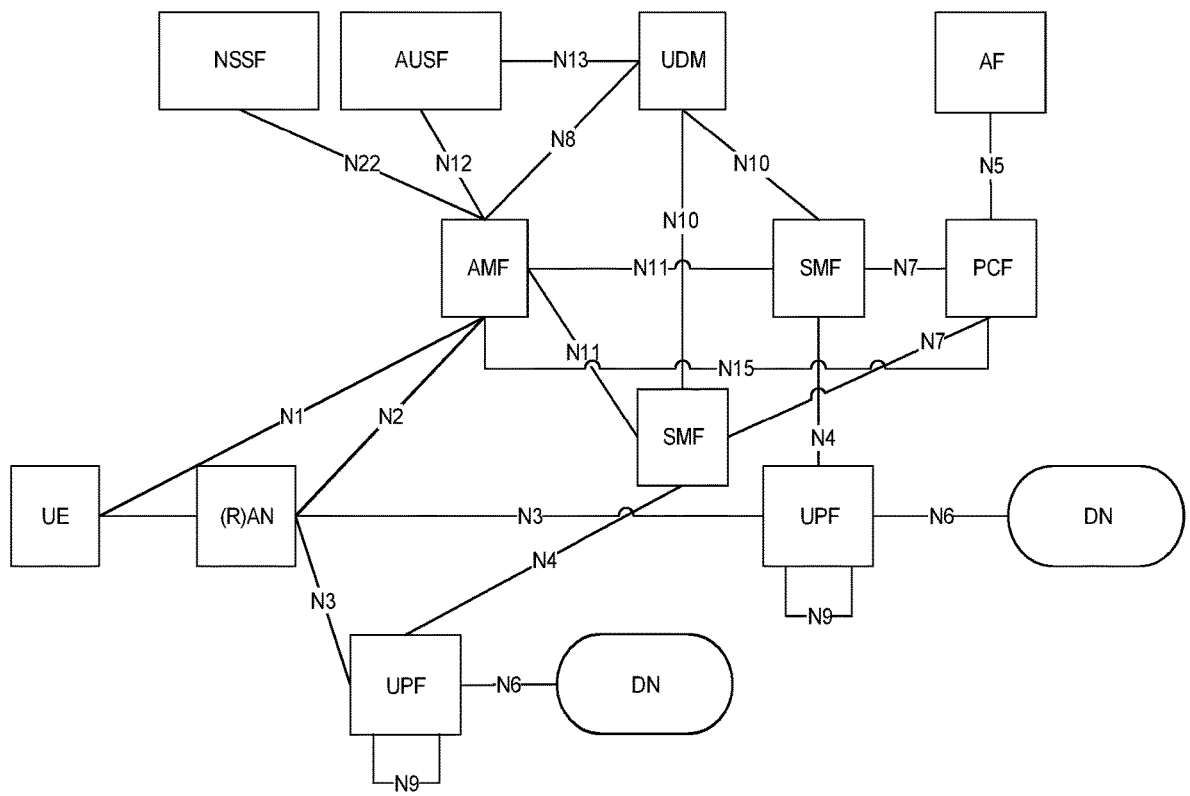
Figure 3:
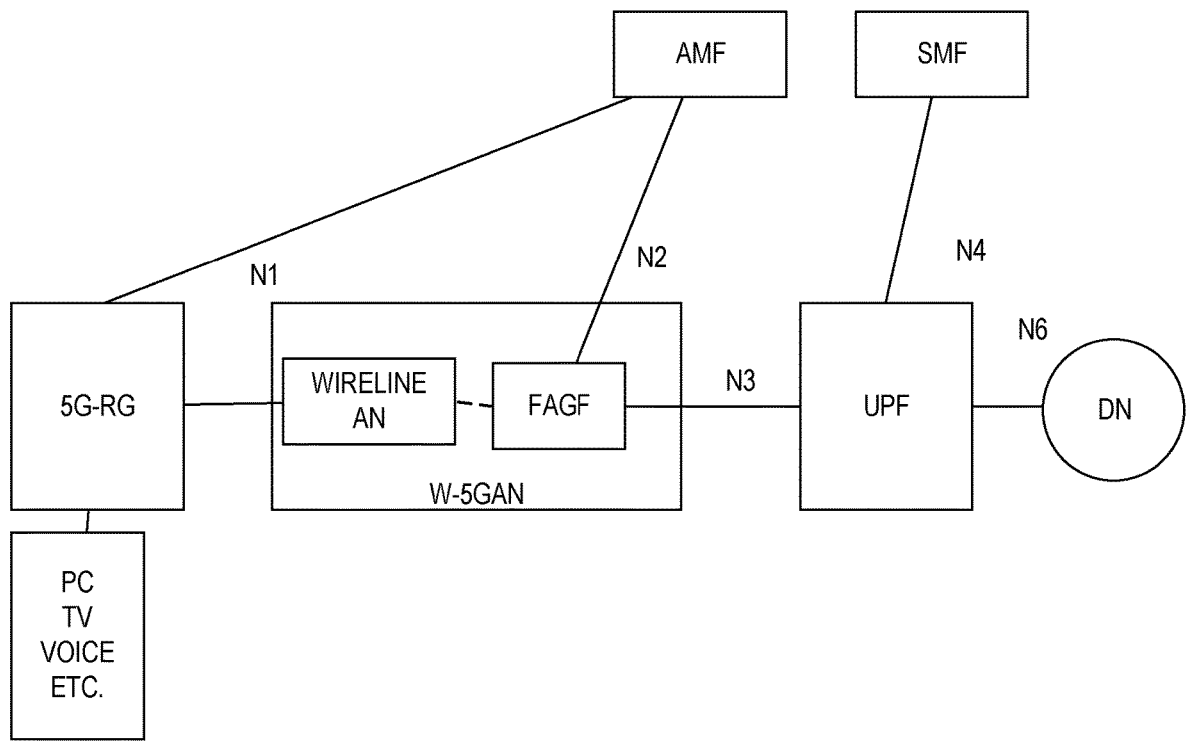
FIG. 3 shows a known reference architecture for W-5GAN.
Figure 4:
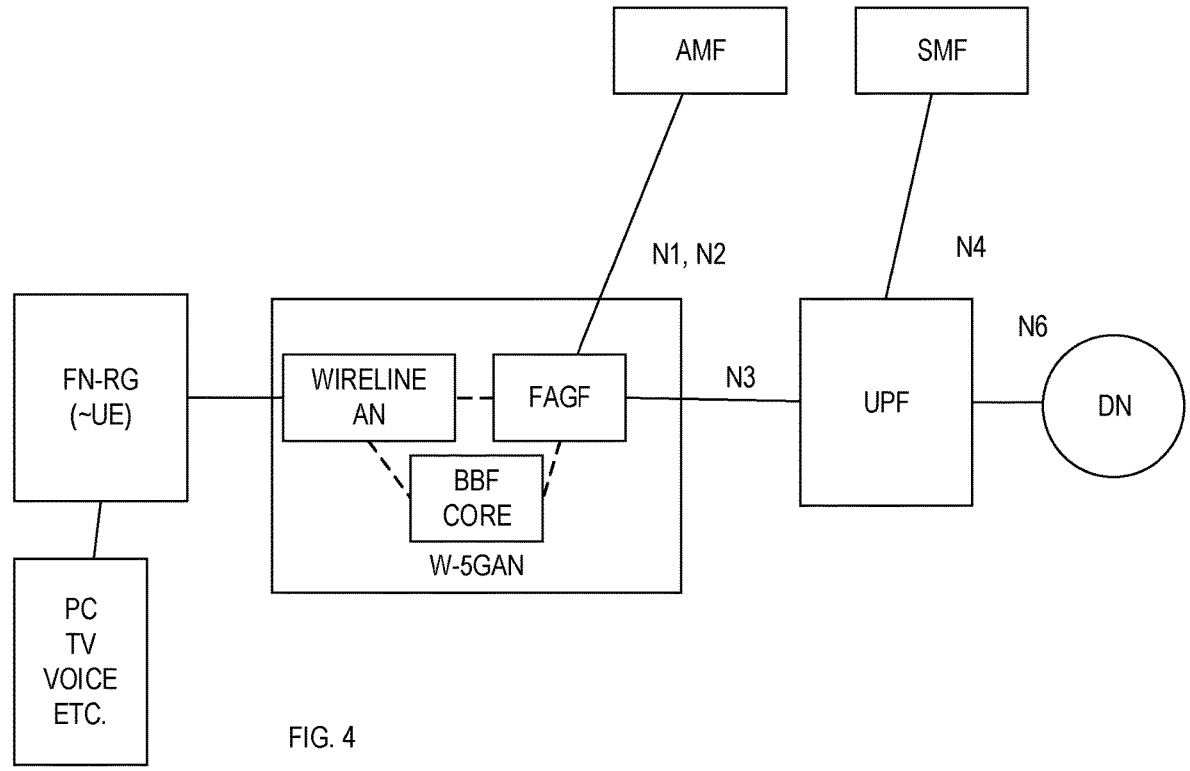
FIG. 4 shows another known reference architecture for W-5GAN.

The methods discussed above may alternatively be implemented by means of a system based on network functions virtualization. In FIG. 16, further embodiments of the invention are implemented by means of such a network function virtualization system, NFVS, formed on e.g. general-purpose servers, standard storage and switches. The NFVS may be arranged along the lines described in FIG. 4, ETSI GS NFV 002 V. 1.1.1 (2013-10) and comprises the following elements: A NFV management and orchestration system comprising an Orchestrator, ORCH, a VNF manager, VNF_MGR, and a virtualised Infrastructure manager, VIRT_INFRA_MGR. The NFVS moreover comprises an operational/business support system, OP/BUSS_SUPP_SYST; a number of virtual network function instances, VNF, by which the method steps explained above are instantiated; and a virtualised infrastructure, VIRT_INFRA. The VIRT_INFRA comprises a virtual computing, VIRT_COMP, virtual network; VIRT_NETW, and virtual memory, VIRT_MEM, a virtualisation layer, VIRT_LAYER, (e.g. hypervisor) and shared hardware resources, SHARED_HARDW_RES comprising computing devices, COMP, network devices, NETW, comprising e.g. standard switches and other network devices, and standard data storage devices, MEM.

Also, one or more programs for a computer or computer program products, comprising instructions for carrying out any of methods according to the method steps above, are provided.

Hence, embodiments of the invention concern among others:

A 5G Fixed Mobile Interworking Function Database entity, FMIF-DB, 10 in a system comprising a Wireline 5G Access Network, W-5GAN, connecting to a Fixed Network Residential Gateway, FN-RG, 7, the W-5GAN comprising a Wireline Access Node, AN, 8 and a 5G Fixed Mobile Interworking Function, FMIF, 9, the FMIF 9 connecting to Access and Mobility Management Function, AMF, 14 and to an User Plane Function, UPF, 13 and the FMIF DN 10, the wireline Access Node 8, coupling to a Fixed Network Residential Gateway, FN-RG 7 providing services such as TV, Internet and voice, the database apparatus 10 being adapted for holding User entity, UE, credentials for providing an identity of an FN-RG 7 as a User Entity, UE, and
UE configuration data for the FN-RG 7.
The database may moreover be adapted for holding
UE dynamic data, such as 5G GUTI.

There is also provided a provisioning service entity 20 in a system comprising a data base entity 10, a UDM 21 and a Certificate Authority, CA 22, the provisioning service entity 20 being adapted for receiving a create user message 71 from an actor 19 such as an operator,
creating 72 a subscription for a Fixed Network Residential Gateway, FN-RG, 7, identity in the provisioning service entity 20, issuing 74A a request to UDM, Unified Data Management/UDR, Unified Data Repository, 21 to setup UE credential and configuration, issuing 75A request to 5G Fixed Mobile Interworking Function Database, FMIF-DB 10 to setup UE credential and configuration data for FN-RG 7.

Further, the provisioning service entity 20 may be adapted for, upon an FMIF-DB 10 entry is created for the UE, and receiving 75C a create user response message from the FMIF DB 10, transmitting a Create User Response to the actor 19.

The provisioning service entity 20 may moreover be adapted for connecting to a Certificate Authority, CA, the method comprising request 73A a FN-RG certificate from a CA, receive 73B a FN-RG certificate from the CA.

Also, a 5G Fixed Mobile Interworking Function Database entity, FMIF, 9 is provided being adapted for communicating with a 5G Fixed Mobile Interworking Function Database entity database, FMIF-DB 10, the FMIF moreover being adapted for communicating with a Wireline Access Node, AN, 8 and an Access and Mobility Management Function, AMF 14, the FMIF being further adapted for upon receiving 82 a Dynamic Host Configuration Protocol, DHCP, discover message from the AN comprising a circuit ID, issuing 83 a request for a circuit identity, ID, performing 85, 86, 87 NAS procedures with the AMF, issuing 88 a store request message to the FMIF-DB, receiving 89 a response from the FMIF-DB.

For the FMIF, a DHCP offer may be issued to a Fixed Network Residential Gateway, FN-RG, 7.

A computer program product or computer program is set forty adapted for carrying out the steps above.

Also a method for a 5G Fixed Mobile Interworking Function Database entity, FMIF-DB, 10 is set forth in a system comprising a Wireline 5G Access Network, W-5GAN, connecting to a Fixed Network Residential Gateway, FN-RG, 7, the W-5GAN comprising a Wireline Access Node, AN, 8 and a 5G Fixed Mobile Interworking Function, FMIF, 9, the FMIF 9 connecting to Ac-cess and Mobility Management Function, AMF, 14 and to an User Plane Function, UPF, 13 and the FMIF DN 10, the wireline Access Node 8, coupling to a Fixed Network Residential Gateway, FN-RG 7 providing services such as TV, Internet and voice, the database apparatus 10 being adapted for holding User entity, UE, credentials for providing an identity of an FN-RG 7 as a User Entity, UE, and UE configuration data for the FN-RG 7.

The Database may moreover be adapted for holding UE dynamic data, such as 5G GUTI.

Provided is also a method for a provisioning service entity 20 is in a system comprising a data base entity 10, a Unified Data Management/Unified Data Repository, UDM/UDR 21 and a Certificate Authority, CA 22, comprising receiving a create user message 71 from an actor 19 such as an operator, creating 72 a subscription for a Fixed Network Residential Gateway, FN-RG, 7, identity in the provisioning service entity 20, issuing 74A a request to UDM, Unified Data Management/UDR, Unified Data Repository, 21 to setup UE credential and configuration, issuing 75A request to 5G Fixed Mobile Interworking Function Database, FMIF-DB 10 to setup UE credential and configuration data for FN-RG 7.

The method for a provisioning service entity 20, may involve upon an FMIF-DB 10 entry is created for the UE, and receiving 75C a create user response message from the FMIF DB 10, transmitting a Create User Response to the actor 19.

The method for a provisioning service entity 20 may moreover be adapted for connecting to a Certificate Authority, CA, the method comprising issuing a request 73A for a FN-RG certificate from a CA, receiving 73B a FN-RG certificate from the CA.

There is provided a method for a 5G Fixed Mobile Interworking Function Database entity, FMIF, 9 adapted for communicating with a 5G Fixed Mobile Interworking Function Database entity database, FMIF-DB, 10, the FMIF moreover being adapted for communicating with a Wireline Access Node, AN, 8 and an Access and Mobility Management Function, AMF 14, the FMIF being further adapted for upon receiving 82 a Dynamic Host Configuration Protocol, DHCP, discover message from the AN comprising a circuit ID, issuing 83 a request for a circuit identity, ID, performing 85, 86, 87 NAS procedures with the AMF, issuing 88 a store request message to the FMIF-DB, receiving 89 a response from the FMIF-DB.

For the method for a FMIF, a DHCP offer may be issued to a Fixed Network Residential Gateway, FN-RG, 7.

The invention claimed is:

1. A system comprising:

a 5G Fixed Mobile Interworking Function Database entity (FMIF-DB);

an Access and Mobility Management Function (AMF);

a User Plane Function (UPF);

a Fixed Network Residential Gateway (FN-RG);

a Wireline 5G Access Network (W-5GAN); and a provisioning service entity, wherein the W-5GAN is connected to the FN-RG, wherein the W-5GAN comprises a Wireline Access Node (AN) and a 5G Fixed Mobile Interworking Function (FMIF), wherein the FMIF is connected to the AMF and to the UPF and to the FMIF-DB, wherein the AN is coupled to the FN-RG, wherein the provisioning service entity is configured to perform operations comprising:

receiving a create user message from a network operator;

creating a subscription for a FN-RG identity in the provisioning service entity; and issuing a request to the FMIF-DB to setup and store a User Entity (UE) credential and configuration data for the FN-RG, and wherein the FMIF-DB is configured to perform operations comprising:

storing the received UE credentials for providing an identity of the FN-RG as a UE;

storing the UE configuration data for the FN-RG;

receiving a circuit identity (ID) request message from the FMIF in response to the FMIF receiving a circuit ID discovery message from the AN; and responding to the FMIF with the circuit ID.

2. The system according to claim 1, wherein the FMIF-DB is further configured to perform the operations comprising holding UE dynamic data comprising a 5G Globally Unique Temporary Identity (GUTI).

3. The system according to claim 1, wherein the operations further comprise:
creating an FMIF-DB entry for the UE;
receiving a create user response message from the FMIF-DB; and
transmitting a Create User Response to the network operator.

4. A method of operation for a system comprising:
connecting a Wireline 5G Access Network (W-5GAN) to a Fixed Network Residential Gateway (FN-RG), wherein the W-5GAN comprises a Wireline Access Node (AN) and a 5G Fixed Mobile Interworking Function (FMIF);
connecting the FMIF to an Access and Mobility Management Function (AMF) and to a User Plane Function (UPF) and to a 5G Fixed Mobile Interworking Function Database entity (FMIF-DB),
coupling the AN to the FN-RG;
receiving, by a provisioning service entity, a create user message from a network operator;
creating, by the provisioning service entity, a subscription for the FN-RG identity in a provisioning service entity;
issuing, by the provisioning service entity, a request to the FMIF-DB to setup and store a User Entity (UE) credential and configuration data for the FN-RG;
storing, by the FMIF-DB, the UE credentials for providing an identity of the FN-RG as a UE;
storing, by the FMIF-DB, the UE configuration data for the FN-RG;
receiving, by the FMIF-DB, a circuit identity (ID) request message from the FMIF in response to the FMIF receiving a circuit ID discovery message from the AN; and
responding, by the FMIF-DB, to the FMIF with the circuit ID.

5. The method according to claim 4 further comprising holding, by the FMIF-DB, UE dynamic data.

6. The method according to claim 4 further comprising:
creating an FMIF-DB entry for the UE in the FMIF-DB;
receiving a create user response message from the FMIF-DB; and
transmitting a Create User Response to the network operator in response to receiving the create user response message.

7. The method according to claim 5, wherein the UE dynamic data comprises a 5G Globally Unique Temporary Identity (GUTI).

* * * * *